United States Patent
Chen et al.

(10) Patent No.: US 11,281,548 B2
(45) Date of Patent: Mar. 22, 2022

(54) 2-PHASE SYNC REPLICATION RECOVERY TO OPTIMIZE RECOVERY POINT OBJECTIVE (RPO)

(71) Applicant: EMC IP HOLDING COMPANY LLC, Hopkinton, MA (US)

(72) Inventors: Xiangping Chen, Sherborn, MA (US); Svetlana Kronrod, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 18 days.

(21) Appl. No.: 16/592,271

(22) Filed: Oct. 3, 2019

(65) Prior Publication Data
US 2021/0103508 A1   Apr. 8, 2021

(51) Int. Cl.
*G06F 11/20* (2006.01)
*G06F 11/07* (2006.01)

(52) U.S. Cl.
CPC ........ *G06F 11/2069* (2013.01); *G06F 11/076* (2013.01); *G06F 11/2074* (2013.01); *G06F 11/2076* (2013.01); *G06F 2201/84* (2013.01)

(58) Field of Classification Search
CPC .............. G06F 11/2069; G06F 11/076; G06F 11/2074; G06F 11/2076; G06F 2201/84
USPC ....................................................... 711/162
See application file for complete search history.

(56) References Cited

U.S. PATENT DOCUMENTS

| | | |
|---|---|---|
| 7,475,124 B2 | 1/2009 | Jiang |
| 8,327,103 B1 | 12/2012 | Can et al. |
| 8,380,928 B1 | 2/2013 | Chen et al. |
| 8,429,346 B1 | 4/2013 | Chen et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,583,607 B1 | 11/2013 | Chen et al. |
| 8,683,153 B1 | 3/2014 | Long et al. |
| 8,712,976 B1 | 4/2014 | Chen et al. |
| 8,775,388 B1 | 7/2014 | Chen et al. |
| 8,782,324 B1 | 7/2014 | Chen et al. |
| 8,799,601 B1 | 8/2014 | Chen et al. |
| 8,805,786 B1 * | 8/2014 | Natanzon ............. G06F 16/128 707/639 |
| 8,909,887 B1 | 12/2014 | Armangau et al. |

(Continued)

OTHER PUBLICATIONS

U.S. Appl. No. 15/499,943, filed Apr. 28, 2017, Kucherov et al.

(Continued)

*Primary Examiner* — Gautam Sain
(74) *Attorney, Agent, or Firm* — Daly, Crowley, Mofford & Durkee, LLC

(57) ABSTRACT

A method for use in a storage system disclosed, comprising: transitioning the storage system into a first state, the first state including a state in which a source system performs synchronous replication to a target system; detecting a first event while the source system is in the first state; in response to the first event, transitioning the storage system from the first state into a second state, the second state being a state in which the source system performs asynchronous replication; detecting a second event while the storage system is in the second state, transitioning the source system from the second state into a third state, the third state including a state in which the source system performs both synchronous replication and asynchronous replication.

17 Claims, 5 Drawing Sheets

(56) References Cited

U.S. PATENT DOCUMENTS

| | | |
|---|---|---|
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,851 B1 | 7/2019 | Kronrod et al. |
| 10,353,616 B1 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,459,883 B1 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 2011/0066592 A1* | 3/2011 | Newport ............... G06F 16/273 707/615 |
| 2015/0234860 A1* | 8/2015 | Sakaguchi .......... G06F 11/3419 707/622 |
| 2016/0077917 A1* | 3/2016 | Battepati ............ G06F 11/1451 714/15 |
| 2016/0188232 A1* | 6/2016 | Ramachandran ... G06F 11/1484 711/162 |
| 2017/0192857 A1* | 7/2017 | Meiri .................. G06F 11/1461 |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.

* cited by examiner

2-PHASE SYNC REPLICATION RECOVERY TO OPTIMIZE RECOVERY POINT OBJECTIVE (RPO)

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a storage system is provided, the storage system including a source system that is coupled to a target system via a communications network, the method comprising: transitioning the storage system into a first state, the first state including a state in which the source system performs synchronous replication; detecting a first event while the source system is in the first state, the first event indicating that the source system is unable to meet a constraint that is associated with the synchronous replication; in response to the first event, transitioning the storage system from the first state into a second state, the second state being a state in which the source system performs asynchronous replication; detecting a second event while the storage system is in the second state, the second event indicating that the storage system is again able to meet the constraint; in response to the second event, transitioning the source system from the second state into a third state, the third state including a state in which the source system performs both synchronous replication and asynchronous replication.

According to aspects of the disclosure, an apparatus is provided, comprising: a memory, and at least one processor operatively coupled to the memory, the at least one processor being configured to perform the operations of transitioning a storage system into a first state, the storage system including a source system that is coupled to a target system via a communications network, the first state including a state in which the source system performs synchronous replication; detecting a first event while the source system is in the first state, the first event indicating that the source system is unable to meet a constraint that is associated with the synchronous replication; in response to the first event, transitioning the storage system from the first state into a second state, the second state being a state in which the source system performs asynchronous replication; detecting a second event while the storage system is in the second state, the second event indicating that the storage system is again able to meet the constraint; in response to the second event, transitioning the source system from the second state into a third state, the third state including a state in which the source system performs both synchronous replication and asynchronous replication.

According to aspects of the disclosure, a non-transitory computer-readable storage medium that is configured to store one or more processor-executable instructions, which when executed by at least one processor cause the at least one processor to perform the operations of transitioning a storage system into a first state, the storage system including a source system that is coupled to a target system via a communications network, the first state including a state in which the source system performs synchronous replication; detecting a first event while the source system is in the first state, the first event indicating that the source system is unable to meet a constraint that is associated with the synchronous replication; in response to the first event, transitioning the storage system from the first state into a second state, the second state being a state in which the source system performs asynchronous replication; detecting a second event while the storage system is in the second state, the second event indicating that the storage system is again able to meet the constraint; in response to the second event, transitioning the source system from the second state into a third state, the third state including a state in which the source system performs both synchronous replication and asynchronous replication.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features, FIG. 1 is a diagram of an example of a storage system, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
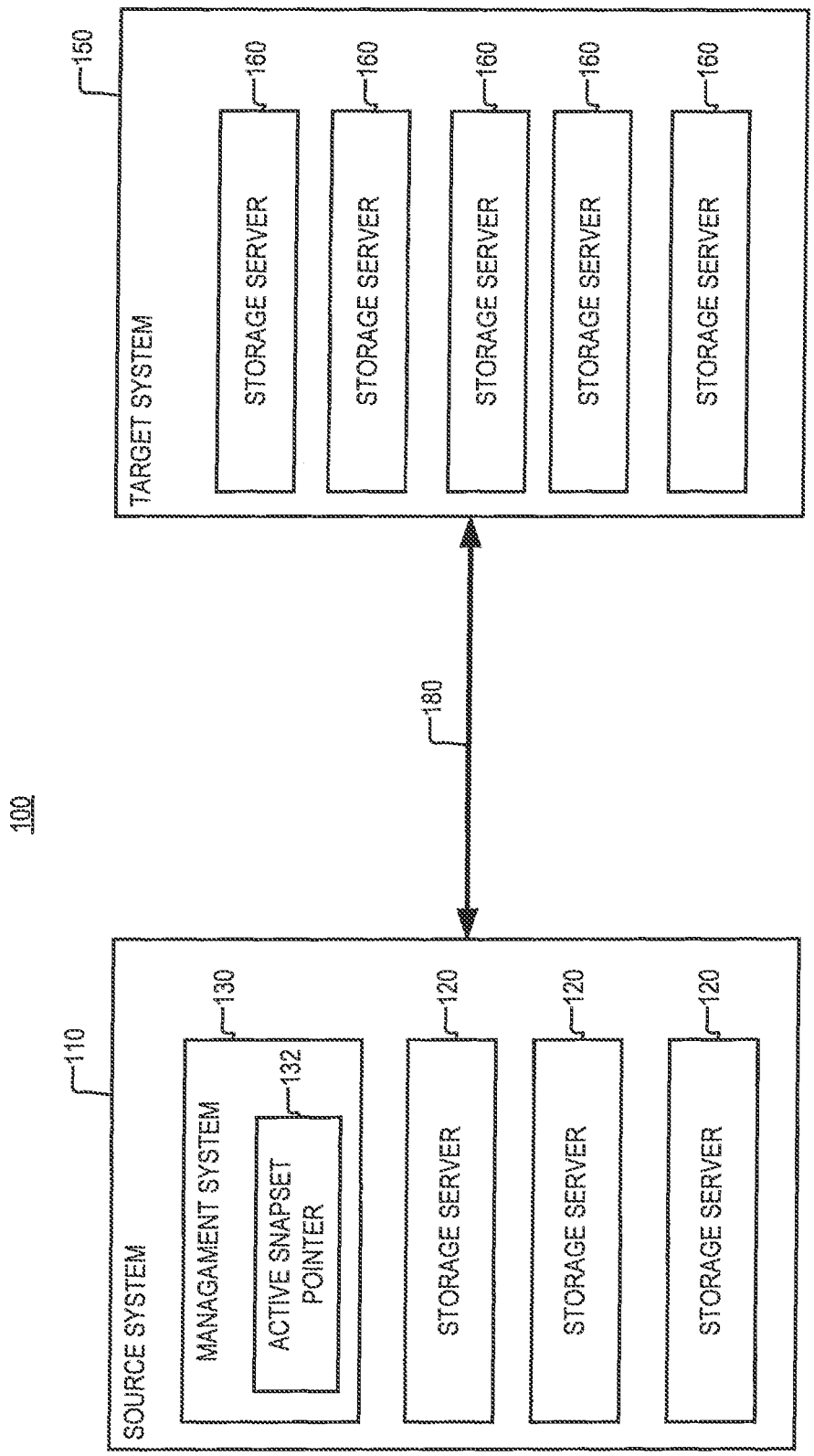

FIG. 1 is a diagram of an example of a storage system 100, according to aspects of the disclosure. The storage system 100 may include a midrange storage system, an enterprise storage system, and/or any other suitable type of storage system. As illustrated, the storage system 100 may include a source system 110 that is coupled to a target system 150 via a communications network 180. The communications network 180 may include an InfiniBand network, a TCP/IP network, and/or any other suitable type of communications network.

The source system 110 may include one or more storage clusters that are configured to maintain a set of one or more storage objects. Each of the storage objects may include a volume, a logical unit, and/or any other suitable type of storage object. Moreover, the source system 110 may be configured to generate snapshots of storage objects and replicate the snapshots to the target system 150. According to aspects of the disclosure, a snapshot may be a point-in time copy (also referred to as "replica" or "snap") of a storage object, such as a volume or a logical unit (LU). In some implementations, a snapshot may not replicate a full copy of a respective storage object. Rather, the snapshot may store only differences between a current version of the respective storage object and a past version of the respective storage object. In some implementations, snapshots may be organized in snapsets. According to aspects of the disclosure, a "snapset" may be a container that includes one or more snapshots, wherein each of the snapshots in the container is generated based on contents of a different storage object. The set of one or more storage objects that are represented in a snapset may be referred to as a "consistency group."

In some implementations, one of the snapsets that are instantiated on the target system 150 may be the "active snapset" of the storage system 100 with respect to a particular consistency group. The active snapset of the storage system 100 (for the consistency group) may be one or more of: (i) a snapset that is stored in the target system 150 where snapshot data (for the consistency group) is being streamed by the source system 110, or (ii) a snapset that is going to be used as a basis for the generation of a "next" snapset in the target system 150.

The source system 110 may include a plurality of storage servers 120 and a management system 130. Each of the storage servers 120 may be implemented by using a computing device, such as the computing device 500, which is discussed further below with respect to FIG. 5. In operation, each of the storage servers 120 may be configured to execute I/O requests that are received at the storage system 100. The I/O requests may include read requests, write requests, and/or any other suitable type of I/O request. Furthermore, in some implementations, the storage servers 120 and 160 may be configured to perform tasks related to snapshot generation and replication. When the storage system 100 is configured (by the management system 130) to perform synchronous replication, any of the storage servers 120 may generate snapshot data for received I/O requests and transmit the generated snapshot data to the target system 150 concurrently with the servicing of the I/O requests. On the other hand, when the storage system 100 is configured (by the management system 130) to perform asynchronous replication, any of the storage servers 120 may generate snapshot data at fixed time intervals.

The management system 130 may be implemented by using a computing device, such as the computing device 500, which is discussed further below with respect to FIG. 5. In operation, the management system may be configured to control the manner in which the storage system 100 performs snapshot replication. For example, in some implementations, the management system 130 may be configured to transition the storage system between different snapshot replication states, as discussed further below with respect to FIG. 3. Additionally or alternatively, as discussed with respect to FIG. 4, the management system 130 may be configured to perform a process 400 for controlling the snapshot replication capabilities of the storage system 100. In some implementations, the management system 130 may store in memory an active snapset pointer, which identifies the active snapset of the storage system 100. In such implementations, the active snapset of the storage system may be changed by modifying the value of the active snapset pointer to point to another snapset.

Although in the present example the management system 130 is implemented as a separate device, alternative implementations are possible in which the management system 130 is executed on one of the storage servers 120 and/or 160. Furthermore, in some implementations, the management system 130 may be implemented on a device that is situated outside of the storage system 100. Stated succinctly, the present disclosure is not limited to any specific implementation of the management system 130.

The target system 150 may include a plurality of storage servers 160, as shown. In some implementations, each of the storage servers 160 may be implemented by using a computing device, such as the computing device 500, which is discussed further below. In some implementations, the storage servers 160 may be configured to store a plurality of target snapsets that contain snapshot data that is provided to the target system 150 by the source system 110. Although not shown, the target system 150 may include a management system and/or any other suitable type of component. In this regard, it will be understood that the present disclosure is not limited to any specific implementation of the target system 150.

Figure 2:
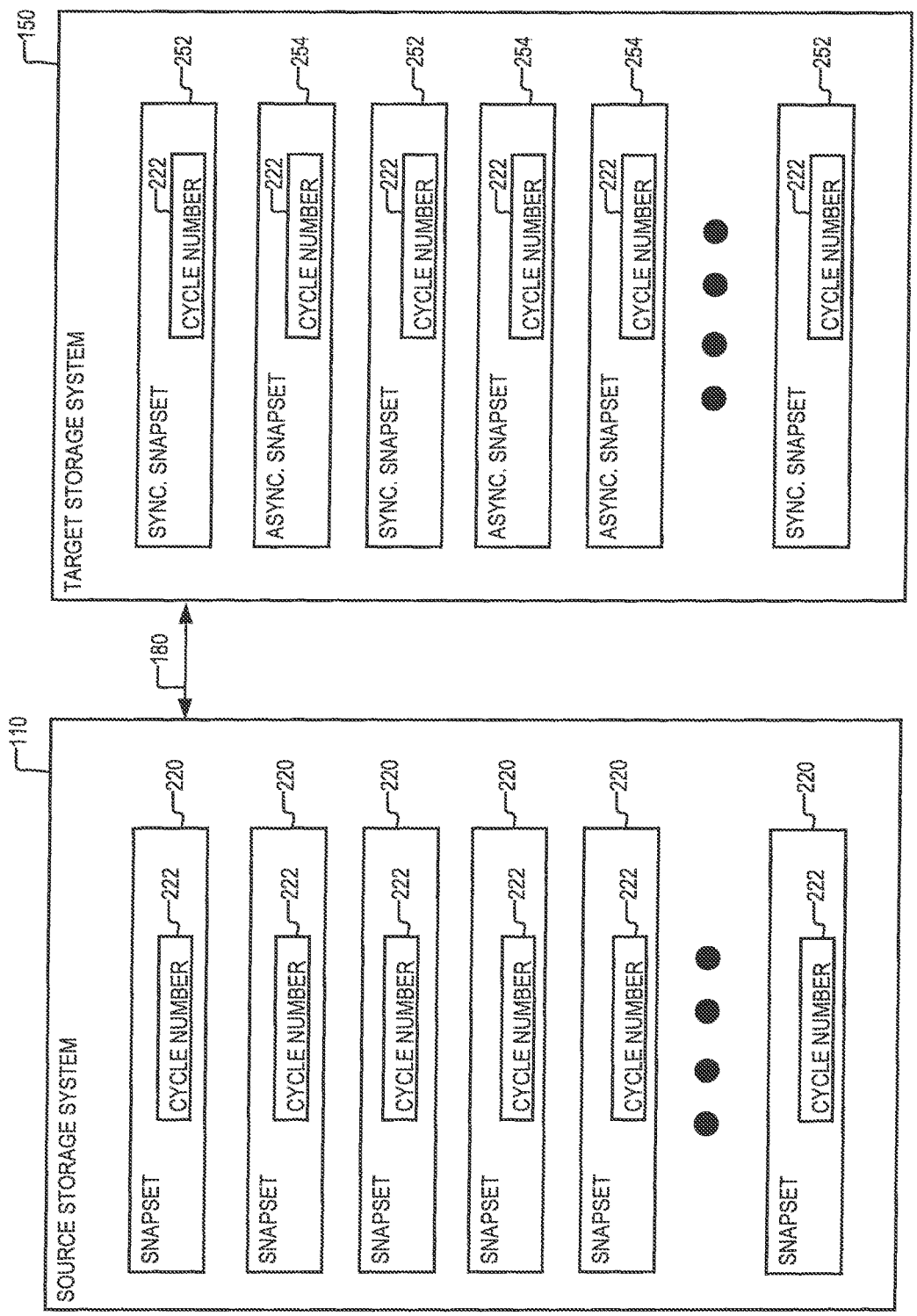
FIG. 2 is a diagram illustrating the operation of the storage system of FIG. 1, according to aspects of the disclosure.

FIG. 2 illustrates the operation of the storage system 100 in further detail. As shown, the source system 110 may store in a memory (of the source system 110) synchronous snapsets 220 and the target system 150 may store in a memory (of the source system 110) snapsets 252 and 254. Each of the synchronous snapsets 252 may be a synchronous snapset. As such, each of the synchronous snapsets 252 may include snapshot data that is generated by performing synchronous replication. Each of the asynchronous snapsets 254 may be an asynchronous snapset. As such, each of the asynchronous snapsets 254 may include snapshot data that is generated by performing asynchronous replication. Each of the synchronous snapsets 220, 252, and 254 may be associated with a respective cycle number 222. The cycle numbers 222 may identify (or otherwise indicate) one or more of: (i) the order in which the snapsets 220, 252, and 254 are generated relative to one another, and (ii) the time when the data in the snapsets 220, 252, and 254 is generated. Examples concerning the generation and replication snapshots is discussed in further detail in U.S. Pat. No. 10,310,951, titled Storage System Asynchronous Data Replication Cycle Trigger with Empty Cycle Detection, and U.S. Pat. No. 10,324,640, titled Storage System with Consistent Initiation of Data Replication Across Multiple Distributed Processing Modules, both of which are herein incorporated by reference in their entirety.

The management system 130 may control whether the storage system 100 performs synchronous replication or asynchronous replication. Specifically, while the storage system 100 is in state in which it performs synchronous replication, the management system 130 may monitor various parameters of the storage system 100 to detect whether the storage system 100 is able to meet one or more predetermined constraints relating to the performance of synchronous replication. In response to detecting that the storage system 100 stops being able to meet the predetermined constraints, the management system 130 may cause the storage system 100 to stop performing synchronous replication and begin performing asynchronous replication instead. When the condition of the storage system 100 has improved and the storage system 100 is again able to meet the predetermined constraints, the management system 130 may cause the storage system 100 to resume performing synchronous replication. In other words, in some implementations, the management system 130 may dynamically switch the storage system 100 between state(s) in which the storage system 100 performs synchronous replication, and state(s) in which the storage system 100 performs asynchronous replication.

The management system 130 may be configured to monitor the latency, bandwidth, and/or any other suitable type of metric the communications network 180. In some implementations, the management system 130 use these metrics to determine whether a predetermined condition is satisfied. For example, the condition may specify the maximum latency which the communications network 180 can possess when synchronous replication is being performed by the storage system 100. As another example, the condition may provide a minimum bandwidth which the communications network 180 can possess when synchronous replication to be conducted. When the management system 130 detects that the condition is not satisfied, the management system 130 may regard the storage system 100 as unable to meet a constraint that is associated with synchronous replication. As discussed further below with respect to FIGS. 3 and 4, in such situations, the management system 130 may transition the storage system 100 from: (i) a first state in which the storage system 100 performs synchronous replication to (ii) a second state in which the storage system 100 does not perform synchronous replication.

Furthermore, the management system 130 may be configured to continue to monitor the network metric(s) to detect when the communications network 180 begins to satisfy the condition again. For example, when the management system 130 detects that the communications network 180 satisfies the condition (after previously detecting that the communications network 180 has failed to satisfy the condition), the management system 130 may regard the storage system 110 as being able to meet the constraint that is associated with synchronous replication. As discussed further below with respect to FIGS. 3 and 4, in such situations, the management system 130 may transition the storage system 100 from: (i) the second state in which the storage system 100 does not perform synchronous replication to (ii) the first state in which the storage system 100 performs synchronous replication.

Additionally or alternatively, in some implementations, the management system 130 may be configured to detect when a request to store synchronous snapshot data has failed. The request may include a request that is transmitted by the source system 110 to the target system 150. When the request is transmitted, the source system 110 may set a watchdog timer, which may be subsequently reset if the completion of the request is confirmed by the target system 150 within a predetermined timeout period. If no confirmation is received from the target system 150 within the timeout period, the watchdog timer may expire. The management system 130 may detect that the watchdog timer has expired, and determine that the request has failed. When it is determined that the request is failed, the management system 130 may regard the storage system 100 as unable to meet a constraint that is associated with synchronous replication. As discussed further below with respect to FIGS. 3 and 4, in such situations, the management system 130 may transition the storage system 100 from: (i) a first state in which the storage system 100 performs synchronous replication to (ii) a second state in which the storage system 100 does not perform synchronous replication.

After the failure of one or more requests to store synchronous data, the storage system may wait for a predetermined time period to pass. After the time period has passed, the management system 130 may deduce that the storage system 100 has returned to a state in which it is again able to perform synchronous replications. In other words, after the predetermined time period has passed, the management system 130 may regard the storage system 110 as being able to meet the constraint that is associated with synchronous replication. As discussed further below with respect to FIGS. 3 and 4, in such situations, the management system 130 may transition the storage system 100 from: (i) the second state in which the storage system 100 does not perform synchronous replication to (ii) the first state in which the storage system 100 performs synchronous replication.

Additionally or alternatively, in some implementations, the management system 130 may be configured to detect when one or more storage servers 160 (or processes) within the target system 150 have failed. The one or more storage servers 160 (or processes) may be used by the target system 150 to perform synchronous replication. For example, the management system 130 may periodically transmit polling messages the one or more storage servers 160 (or processes). When the one or more storage servers 160 (or processes) fail to respond to the polling messages within a predetermined time period, the management system 130 may deduce that the one or more storage servers 160 (or processes) have gone offline (e.g., due to a software or hardware failure). When it is determined that the one or more storage servers 160 (or processes) have gone offline, the management system 130 may regard the storage system 100 as unable to meet a constraint that is associated with synchronous replication. As discussed further below with respect to FIGS. 3 and 4, in such situations, the management system 130 may transition the storage system 100 from: (i) a first state in which the storage system 100 performs synchronous replication to (ii) a second state in which the storage system 100 does not perform synchronous replication.

After the one or more storage servers 160 (or processes) become unresponsive (e.g., due to a hardware or software failure), the management system 130 may continue to poll the one or more storage servers 160 (or processes) to detect when they would come back online. When the one or more storage servers 160 (or processes) have come back online, the management system 130 may regard the storage system 110 as being able to meet the constraint that is associated with synchronous replication. As discussed further below with respect to FIGS. 3 and 4, in such situations, the management system 130 may transition the storage system 100 from: (i) the second state in which the storage system 100 does not perform synchronous replication to (ii) the first state in which the storage system 100 performs synchronous replication.

In some respects, synchronous replication may have more strict latency requirements than asynchronous replication. In this regard, monitoring whether one or more constraints associated with synchronous replication are met may amount to detecting conditions that might interfere with the latency (or speed) at which requests to store synchronous snapshot data in the target system 150 are completed. Such conditions may include reductions in network latency or bandwidth, a failure of a target server or process, etc. As noted above, when such conditions are detected, the storage system may stop performing synchronous replication until the conditions are no longer present. Stopping the performance of synchronous replication altogether is advantageous because it may prevent reductions in the speed at which synchronous replication is performed (which would otherwise occur if the synchronous replication is not stopped) from interfering with other operations that are performed by the storage system 100.

Figure 3:
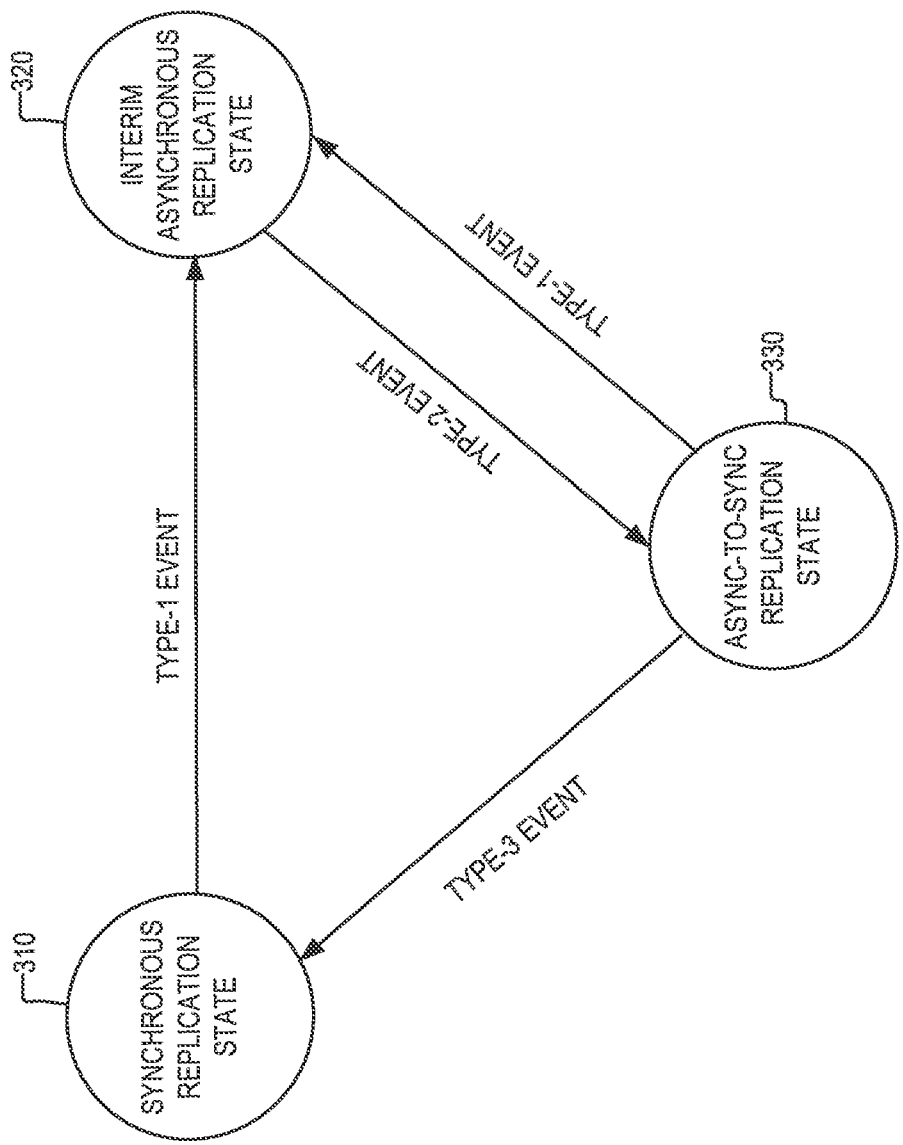
FIG. 3 is a state diagram illustrating the operation of the storage system of FIG. 1, according to aspects of the disclosure.

FIG. 3 is a state diagram illustrating possible snapshot replication states of the storage system 100. As illustrated, the storage system 100 may be in a synchronous replication state 310, interim asynchronous replication state 320, and an async-to-sync replication state 330. When the storage system 100 is in the state 310, the storage system 100 (and/or the source system 110) may perform synchronous replication. Furthermore, when the storage system 100 is in the state 310, the storage system 100 (and/or the source system 110) may not perform asynchronous replication. When the storage system 100 is in the state 320, the storage system 100 (and/or the source system 110) may perform asynchronous replication. Furthermore, when the storage system 100 is in the state 320, the storage system 100 (and/or the source system 110) may not perform synchronous replication. When the storage system 100 is in the state 330, the storage system 100 (and/or the source system 110) may perform bath synchronous replication and asynchronous replication. More particularly, when the storage system 100 is in the state 330, the synchronous replication and the asynchronous replication may be performed concurrently with one another.

The transitions between the states 310, 320, and 330 may be driven by events, which are herein referred to as type-1 events, type-2 events, and type-3 events. For example, when a type-1 event is detected (by the management system 130), while the storage system 100 is in the state 310, the management system 130 may transition the storage system 100 from the state 310 to the state 320. When a type-2 event is detected (by the management system 130), while the storage system 100 is in the state 320, the management system 130 may transition the storage system 100 from the state 320 to the state 330. When a type-1 is detected (by the management system 130), while the storage system is in the state 320, the management system 130 may transition the storage system 100 from the state 320 to the state 310. And when a type-3 event is detected (by the management system 130), while the storage system is in the state 330, the management system 130 may transition the storage system 100 from the state 330 to the state 310.

Type-1 events may be generated by a process that is executed in any of the storage servers 120, a process that is executed by the storage servers 160, a process that is executed by the management system 130 (e.g., a monitoring process), or a process that is executed any other component of the storage system 100. Type-1 events may be generated when a metric of the communications network 180 fails to meet a threshold (e.g., when the network's latency exceeds a first threshold, or when the network's bandwidth falls below a second threshold, etc.). Additionally, or alternatively, in some implementations, type-1 events may be generated when one or more requests to store synchronous replication have failed. Additionally or alternatively, in some implementations, type-1 events may be generated when one or more storage servers in the target system 150 have gone offline (e.g., due to a hardware or software failure). Stated succinctly, the type-1 events may include any event indicating that the storage system 100 is unable to meet a constraint associated with synchronous replication.

Type-2 events may be generated by a process that is executed in any of the storage servers 120, a process that is executed by the storage servers 160, a process that is executed in the management system 130 (e.g., a monitoring process), or a process that is executed any other component of the storage system 100. Type-2 events may be generated when a metric of the communications network 180 meets a threshold, after previously not being able to meet the threshold. For example, type-2 events may be generated when the network's latency falls below the first threshold, or when the network's bandwidth falls exceeds the second threshold, etc. Additionally, or alternatively, in some implementations, type-2 events may be generated when a predetermined time period has passed since the failure of one or more requests to storage synchronous snapshot data (e.g., snapshot data) on the target system 150 have failed. Additionally or alternatively, in some implementations, type-2 events may be generated when one or more storage servers in the target system 150 have returned online (after going offline due to a software or hardware failure). Stated succinctly, the type-2 events may include any event indicating that the storage system 100 has become able to meet a constraint associated with synchronous replication after previously failing to meet the constraint.

Type-3 events may be generated while the storage system 100 is performing both synchronous and asynchronous replication. Type-3 events signal that storage system 100 may safely stop performing asynchronous replication and continue to perform only synchronous replication. Type-3 events may be generated when one or more asynchronous requests to store snapshot data on the storage system 100 have completed successfully. Additionally or alternatively, type-3 events may be generated when all asynchronous storage requests that are pending in the storage system 100 have been completed. Type-3 events may be generated by a process that is executed in any of the storage servers 120, a process that is executed by the storage servers 160, a process that is executed in the management system 130 (e.g., a monitoring process), or a process that is executed any other component of the storage system 100.

Figure 4:
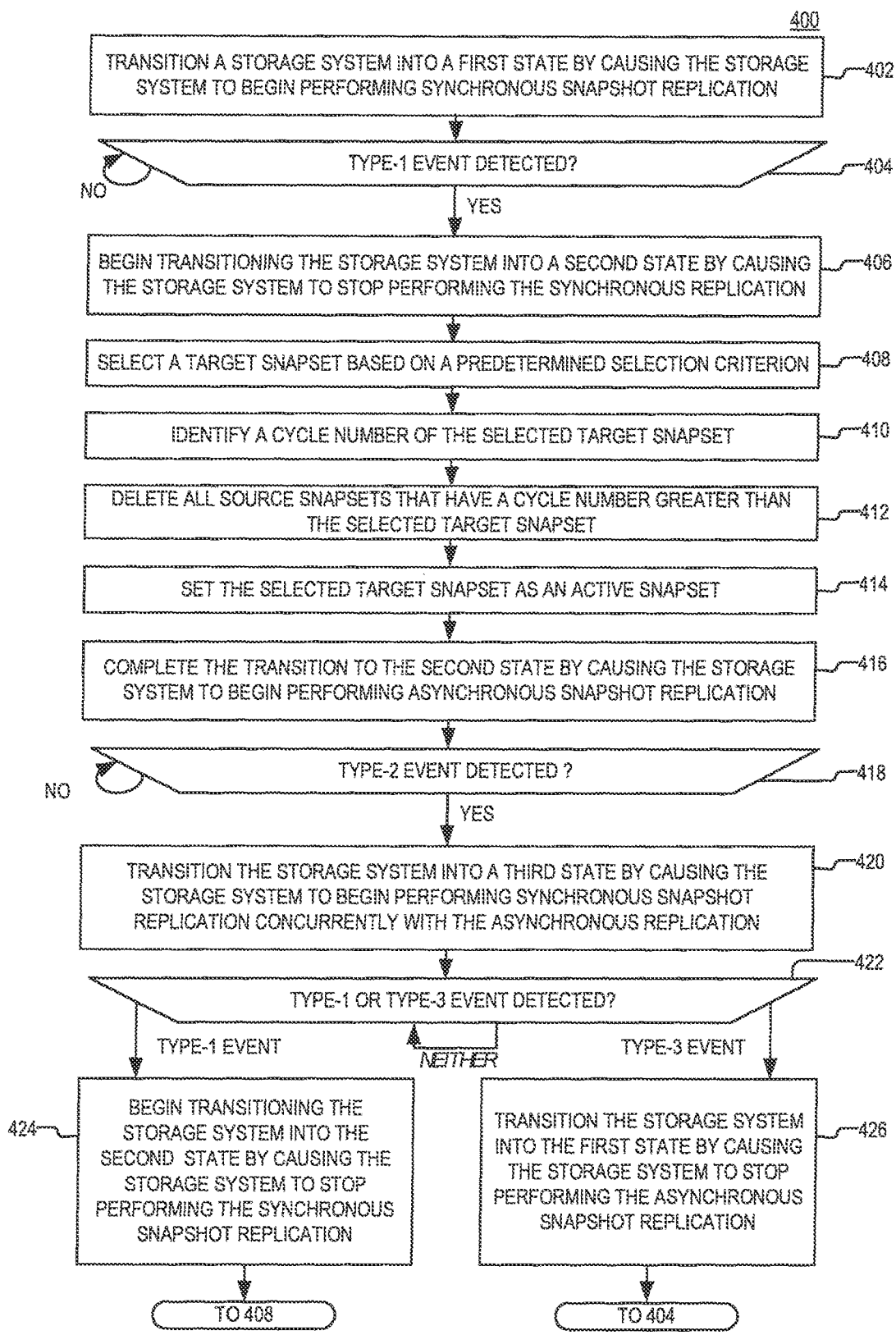
FIG. 4 is a flowchart of an example of a process, according to aspects of the disclosure.

FIG. 4 is a flowchart of an example of a process 400, according to aspects of the disclosure. According to the present example, the process 400 is performed by the management system 130. However, it will be understood that the process 400 can be performed by any component (or set of components) of the storage system 100.

At step 402, the management system 130 transitions the storage system 100 into the state 310. As noted above, the state 310 may include a state in which the source system 110 performs only synchronous replication. In some implementations, the management system 130 may transition the storage system 100 into the state 310 by transmitting to the storage servers 120 one or more commands, which, when received by the storage servers 120, cause the storage servers 120 to begin performing synchronous replication.

At step 404, the management system 130 determines whether a event is generated by one or more components of the storage system 100. If a type-1 event is detected, the process 400 proceeds to step 406. Otherwise, if a type-1 event is not detected, step 404 is repeated.

At step 406, the management system 130 begins transitioning the storage system 100 into the state 320 by causing the storage system 100 to stop performing synchronous replication. In some implementations, the management system 130 may cause the storage system 100 to stop performing continuous snapshot replication by transmitting to the storage servers 120 one or more commands, which, when received by the storage servers 120, cause the storage servers 120 to stop performing synchronous replication.

At step 408, the management system 130 selects a target snapset in accordance with a predetermined selection criterion. According to the present example, the selected target set includes the most recent one among the asynchronous snapsets 254.

At step 410, the management system 130 identifies the cycle number 222 of the selected snapset.

At step 412, the management system 130 deletes (from the source system 110) all synchronous snapsets 220 that have a cycle number that is larger than the cycle number of the selected target snapset. As a result of executing step 412, only synchronous snapsets 220 may remain stored on the source system 110 whose respective cycle numbers 222 are smaller than the cycle number of the selected snapset.

At step 414, the management system 130 sets the selected snapset as the active snapset of the storage system 100. In some implementations, setting the selected snapset as the active snapset may include changing the value of the active snapset pointer 132 to identify the selected snapset.

At step 416, the management system 130 completes the transition of the storage system 100 into the state 320 by causing the storage system 100 to begin performing asynchronous replication. In some implementations, the management system 130 may transition the storage system 100 into the state 320 by transmitting to the storage servers 120 one or more commands, which, when received by the storage servers 120, cause the storage servers 120 to begin performing asynchronous replication.

In some implementations, the asynchronous replication may be performed in accordance with a minimum recovery point objective (RPO) of the storage system 100. The minimum RPO may be the smallest RPO among a plurality of RPOs that are specified in a policy file of the storage system 100. As noted above, each of the RPOs may specify a different time interval at which snapshot replication is to be performed. Performing the asynchronous replication in accordance with the minimum RPO is advantageous because it permits the asynchronous data replication to mimic the effects of synchronous data replication (in terms of immediacy of data backup) as much as possible under the current configuration of the storage system 100.

At step 418, the management system 130 determines whether a type-2 event is generated by one or more components of the storage system 100. If a type-2 event is detected, the process 400 proceeds to step 420. Otherwise, if a type-2 event is not detected step 418 is executed again.

At step 420, the management system transitions the storage system 100 into the state 330. As noted above, the state 330 may include a state in which the source system 110 performs both asynchronous replication and synchronous replication. In some implementations, the management system 130 may transition the storage system 100 into the state 330 by transmitting to the storage servers 120 one or more commands, which, when received by the storage servers 120, cause the storage servers 120 to begin performing synchronous replication while continuing to perform asynchronous replication.

At step 422, the management system 130 determines whether a type-1 event or a type-3 event is generated by one or more components of the storage system 100. If a type-1 event is detected, the process 400 proceeds to step 424. If a type-3 event is detected, the process 400 proceeds to step 426. Otherwise, if neither a type-1 nor type-3 event is detected, step 422 is repeated.

At step 424, the management system 130 transitions the storage system 100 to the state 320. As noted above, the state 320 may include a state in which the source system 110 performs only asynchronous replication. In some implementations, the management system 130 may transition the storage system 100 into the state 320 by transmitting to the storage servers 120 one or more commands, which, when received by the storage servers 120, cause the storage servers to stop performing asynchronous replication.

At step 426, the management system 130 transitions the storage system 100 to the state 310. As noted above, the state 310 may include a state in which the source system 110 performs only synchronous replication. In some implementations, the management system 130 may transition the storage system 100 into the state 310 by transmitting to the storage servers 120 one or more commands, which, when received by the storage servers 120, cause the storage servers 120 to stop performing asynchronous replication. Additionally or alternatively, at step 426, the management system 130 may set a synchronous snapset 252 as the active snapset of the storage system 100. The synchronous snapset 252 that is set as the active set may be either a snapset that is instantiated when step 426 is executed or a previously-instantiated synchronous snapset 252.

In some implementations, performing synchronous replication by the storage system 100 (or source system 110) may include transmitting synchronous snapshot data from any of the storage servers 120 to any of the storage servers 160, which are part of the target system 150. The synchronous snapshot data may be associated with an I/O request that is received at the storage system 100. The I/O request may include a request to delete data stored in the storage system 100, a request to write data to the storage system 100 and/or any other suitable type of I/O request. More particularly, the synchronous snapshot data may be generated based on data that is associated with the I/O request (e.g., data that is desired to be stored in the storage system 100 or data that is desired to be deleted from the storage system 100). In some implementations, when synchronous snapshot data is performed, the synchronous snapshot data that is associated with a particular I/O request (or a set of I/O requests) may be transmitted to the target system 150 concurrently (or otherwise in line) with the servicing of the I/O request (or set of I/O requests) by the storage system 100.

In some implementations, performing asynchronous replication by the storage system 100 (or source system 110) may include transmitting asynchronous snapshot data from any of the storage servers 120 to any of the storage servers 160, which are part of the target system 150. The asynchronous snapshot data may be transmitted at fixed intervals, which are specified by an RPO of the storage system. The asynchronous snapshot data may be generated based on one or more snapshots of a volume (or another storage object) of the storage system 100. It will be understood that various techniques for generating synchronous and asynchronous snapshot data are known in the art. In this regard, it will be understood that the present disclosure is not limited to any specific technique for generating synchronous and asynchronous snapshot data.

Figure 5:
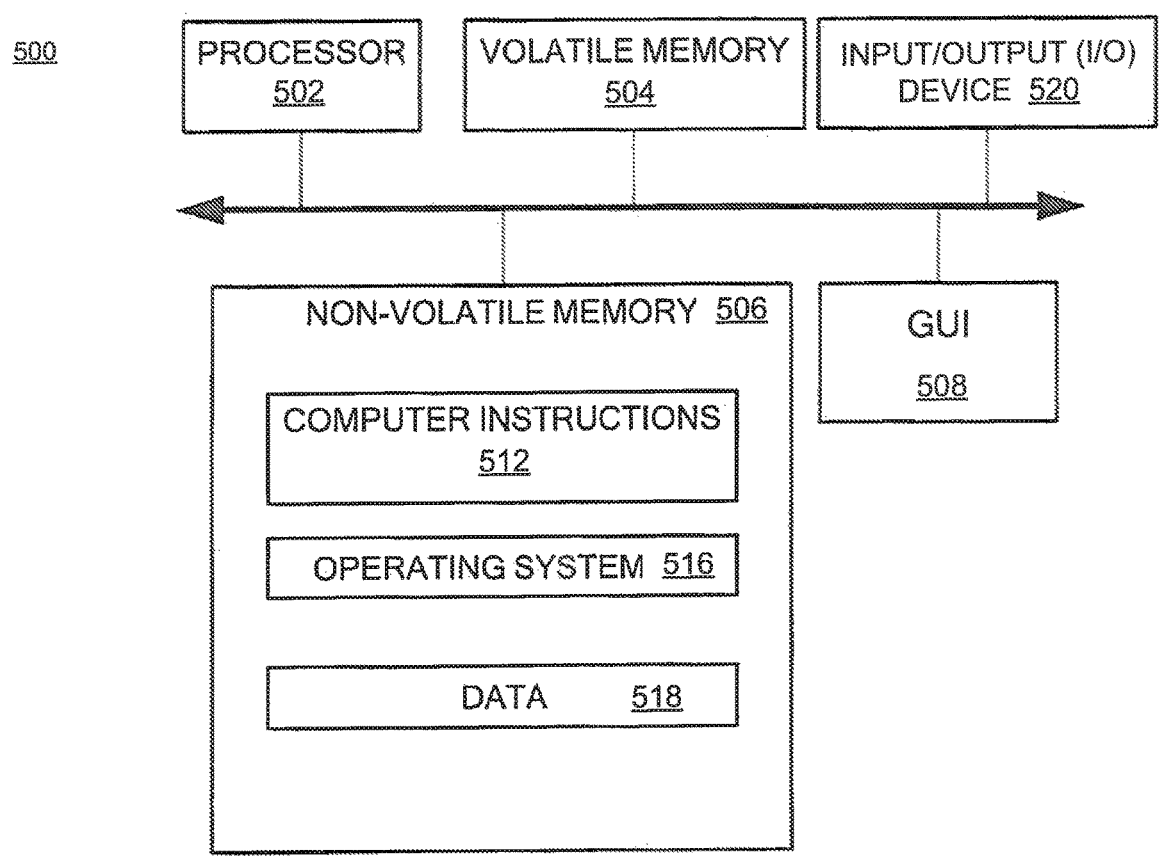
FIG. 5 is a diagram of an example of a computing device, according to aspects of the disclosure.

Referring to FIG. 5, in some implementations, any of the management system 130, the storage servers 120, and the storage servers 160 may be implemented as one or more computing devices 500. Each computing device 500 may include processor 502, volatile memory 504 (e.g., RAM), non-volatile memory 506 (e.g., a hard disk drive, a solid state drive such as a flash drive, a hybrid magnetic and solid state drive, etc.), graphical user interface (GUI) 508 ('e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504 to perform at least a portion of the process 400 and/or any other function of the storage system 100.

FIGS. 1-5 are provided as an example only. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any, of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, the storage system including a source system that is coupled to a target system via a communications network, the method comprising:

transitioning the storage system into a first state, the first state including a state in which the source system performs synchronous replication, the source system being arranged to store a plurality of source snapsets, each of the source snapsets including a container that stores one or more snapsets, each of the source snapsets begin associated with a respective cycle number that indicates an order in which the source snapset is created relative to: (i) other source snapsets and (ii) asynchronous snapsets that are stored at the target system;

detecting a first event while the source system is in the first state, the first event indicating that the source system is unable to meet a constraint that is associated with the synchronous replication;

in response to the first event, transitioning the storage system from the first state into a second state, the second state being a state in which the source system performs asynchronous replication, wherein transitioning the storage system from the first state into the second state includes: identifying an asynchronous snapset that is stored at the target system, identifying a cycle number for the asynchronous snapset, and deleting, at the source system, any of the plurality of source snapsets that have cycle numbers greater than the cycle number of the asynchronous snapset;

detecting a second event while the storage system is in the second state, the second event indicating that the storage system again meets the constraint; and in response to the second event, transitioning the source system from the second state into a third state, the third state including a state in which the source system performs both synchronous replication and asynchronous replication, wherein the asynchronous snapset includes a container that contains one or more snapshots and the cycle number of the asynchronous snapset indicates an order in which the asynchronous snapset is created relative to any of the plurality of source snapsets.

2. The method of claim 1, wherein, while the source system is in the second state, asynchronous snapshot data and synchronous snapshot data are streamed to a same snapset.

3. The method of claim 1, further comprising:
detecting a third event, the third event including an event indicating that the storage system is unable to meet the constraint; and
in response to detecting the third event, transitioning the storage system back to the second state.

4. The method of claim 1, further comprising:
detecting a third event, the third event including an event indicating that one or more in-flight asynchronous replication tasks have been completed; and
in response to detecting the third event, transitioning the storage system back to the first state.

5. The method of claim 1, wherein transitioning the storage system from the first state into the second state includes stopping the synchronous replication and beginning the asynchronous replication.

6. The method of claim 1, wherein transitioning the storage system from the second state into the third state includes resuming the synchronous replication.

7. An apparatus, comprising:
a memory, and
at least one processor operatively coupled to the memory, the at least one processor being configured to perform the operations of:
transitioning a storage system into a first state, the storage system including a source system that is coupled to a target system via a communications network, the first state including a state in which the source system performs synchronous replication, the source system being arranged to store a plurality of source snapsets, each of the source snapsets including a container that stores one or more snapshots, each of the source snapsets begin associated with a respective cycle number that indicates an order in which the source snapset is created relative to: (i) other source snapsets and (ii) asynchronous snapsets that are stored at the target system;

detecting a first event while the source system is in the first state, the first event indicating that the source system is unable to meet a constraint that is associated with the synchronous replication;

in response to the first event, transitioning the storage system from the first state into a second state, the second state being a state in which the source system performs asynchronous replication, wherein transitioning the storage system from the first state into the second state includes: identifying an asynchronous snapset that is stored at the target system, identifying a cycle number for the asynchronous snapset, and deleting, at the source system, any of the plurality of source snapsets that have cycle numbers greater than the cycle number of the asynchronous snapset;

detecting a second event while the storage system is in the second state, the second event indicating that the storage system is again able to meet the constraint; and in response to the second event, transitioning the source system from the second state into a third state, the third state including a state in which the source system performs both synchronous replication and asynchronous replication, wherein the asynchronous snapset includes a container that contains one or more snapshots and the cycle number of the asynchronous snapset indicates an order in which the asynchronous snapset is created relative to any of the plurality of source snapsets.

8. The apparatus of claim 7, wherein, while the source system is in the second state, asynchronous snapshot data and synchronous snapshot data are streamed to a same snapset.

9. The apparatus of claim 7, further comprising:
detecting a third event, the third event including an event indicating that the storage system is unable to meet the constraint; and
in response to detecting the third event, transitioning the storage system back to the second state.

10. The apparatus of claim 7, further comprising:
detecting a third event, the third event including an event indicating that one or more in-flight asynchronous replication tasks have been completed; and
in response to detecting the third event, transitioning the storage system back to the first state.

11. The apparatus of claim 7, wherein transitioning the storage system from the first state into the second state includes stopping the synchronous replication and beginning the asynchronous replication.

12. The apparatus of claim 7, wherein transitioning the storage system from the second state into the third state includes resuming the synchronous replication.

13. A non-transitory computer-readable storage medium that is configured to store one or more processor-executable instructions, which when executed by at least one processor cause the at least one processor to perform the operations of:
transitioning a storage system into a first state, the storage system including a source system that is coupled to a target system via a communications network, the first state including a state in which the source system performs synchronous replication, the source system being arranged to store a plurality of source snapsets, each of the source snapsets including a container that stores one or more snapsets, each of the source snapsets begin associated with a respective cycle number that indicates an order in which the source snapset is created relative to: (i) other source snapsets and (ii) asynchronous snapsets that are stored at the target system;

detecting a first event while the source system is in the first state, the first event indicating that the source system is unable to meet a constraint that is associated with the synchronous replication;

in response to the first event, transitioning the storage system from the first state into a second state, the second state being a state in which the source system performs asynchronous replication, wherein transitioning the storage system from the first state into the second state includes: identifying an asynchronous snapset that is stored at the target system, identifying a cycle number for the asynchronous snapset, and deleting, at the source system, any of the plurality of source snapsets that have cycle numbers greater than the cycle number of the asynchronous snapset;

detecting a second event while the storage system is in the second state, the second event indicating that the storage system is again able to meet the constraint; and in response to the second event, transitioning the source system from the second state into a third state, the third state including a state in which the source system performs both synchronous replication and asynchronous replication, wherein the asynchronous snapset includes a container that contains one or more snapshots and the cycle number of the asynchronous snapset indicates an order in which the asynchronous snapset is created relative to any of the plurality of source snapsets.

14. The non-transitory computer-readable storage medium of claim 13, wherein, while the source system is in the second state, asynchronous snapshot data and synchronous snapshot data are streamed to a same snapset.

15. The non-transitory computer-readable storage medium of claim 13, further comprising:
    detecting a third event, the third event including an event indicating that the storage system is unable to meet the constraint; and
    in response to detecting the third event, transitioning the storage system back to the second state.

16. The non-transitory computer-readable storage medium of claim 13, further comprising:
    detecting a third event, the third event including an event indicating that one or more in-flight asynchronous replication tasks have been completed; and
    in response to detecting the third event, transitioning the storage system back to the first state.

17. The non-transitory computer-readable storage medium of claim 13, wherein transitioning the storage system from the first state into the second state includes stopping the synchronous replication and beginning the synchronous replication.

* * * * *